US012653339B2

(12) United States Patent
Adams et al.

(10) Patent No.: US 12,653,339 B2
(45) Date of Patent: Jun. 16, 2026

(54) SWITCHABLE GRILL GRATE ASSEMBLY FOR A COOKING GRILL

(71) Applicant: GrillThink, LLC, Berkeley, CA (US)

(72) Inventors: Charles Adams, Berkeley, CA (US); Andrew Perkins, Berkeley, CA (US)

(73) Assignee: GrillThink! LLC, Berkeley, CA (US)

( * ) Notice: Subject to any disclaimer, the term of this patent is extended or adjusted under 35 U.S.C. 154(b) by 813 days.

(21) Appl. No.: 18/054,086

(22) Filed: Nov. 9, 2022

(65) Prior Publication Data

US 2023/0233021 A1    Jul. 27, 2023

Related U.S. Application Data

(60) Provisional application No. 63/278,096, filed on Nov. 10, 2021.

(51) Int. Cl.
*A47J 37/06*        (2006.01)
(52) U.S. Cl.
CPC ........ *A47J 37/0694* (2013.01); *A47J 2201/00* (2013.01)
(58) Field of Classification Search
CPC ........ A47J 30/00; A47J 30/06; A47J 30/0623; A47J 30/0694; A47J 30/07; A47J 30/0704
USPC .................. 126/540, 25 R, 25 A, 145, 337 R
See application file for complete search history.

(56) References Cited

U.S. PATENT DOCUMENTS 678,308 A * 7/1901 Tobin ....................... A47J 37/08
                                                              99/402
2,335,217 A   11/1943 Tate 2,376,640 A * 5/1945 Wall .................... A47J 37/0694
                                                              99/426
3,273,489 A * 9/1966 Wilson .................. A47J 37/045
                                                              99/450
3,859,903 A * 1/1975 Kipp .................. A47J 37/0878
                                                              99/393
4,432,334 A * 2/1984 Holt .................... A47J 37/0694
                                                              99/449

(Continued)

FOREIGN PATENT DOCUMENTS

DE    102004031921 B4    10/2007
DE    202014001383 U1     5/2014

(Continued)

OTHER PUBLICATIONS

International Search Report and Written Opinion in International (PCT) Application No. PCT/US23/36715, dtd Mar. 8, 2024.

(Continued)

*Primary Examiner* — Daniel I Walsh
(74) *Attorney, Agent, or Firm* — Beeson Skinner Beverly, LLP

(57)            ABSTRACT

A switchable grill grate assembly for a cooking or barbecue grill includes a main frame configured to rest on top of a cooking grill. The main frame provides an open support framework for a horizontal slide track which extends from one end of the support framework to the other. Separate grill grate sections engage with the slide track in a manner that allows one grill grate section to be constrained to sliding back and forth on the slide track and the other grill grate section to be lifted upwardly off of the slide track and rotated up and over the other grill grate section as the first grill grate section slides underneath the second grill grate section.

8 Claims, 14 Drawing Sheets

(56)             References Cited

U.S. PATENT DOCUMENTS

| | | | | |
|---|---|---|---|---|
| 4,867,130 | A * | 9/1989 | Walker | A47J 37/0704 126/25 A |
| 4,987,880 | A * | 1/1991 | Zabala | A47J 37/0694 126/332 |
| 5,069,196 | A * | 12/1991 | Schlosser | A47J 37/0786 126/25 R |
| 5,163,358 | A | 11/1992 | Hanagan et al. | |
| 5,303,692 | A * | 4/1994 | Shasad | A47J 37/0772 126/39 M |
| 5,421,318 | A * | 6/1995 | Unruh | A47J 37/0731 99/421 H |
| 5,782,224 | A * | 7/1998 | Rabell | A47J 37/067 99/395 |
| 5,819,718 | A * | 10/1998 | Leiser | A47J 33/00 126/30 |
| 5,850,828 | A * | 12/1998 | Valentino | A47J 37/0704 126/41 R |
| 5,947,013 | A | 9/1999 | Stewart, Jr. | |
| 6,039,039 | A * | 3/2000 | Pina, Jr. | A47J 37/04 126/339 |
| 6,148,813 | A * | 11/2000 | Barnes | F24C 15/168 126/339 |
| 6,546,845 | B1 | 4/2003 | Lanzilli | |
| 6,810,792 | B1 * | 11/2004 | Knight | A47J 37/0704 99/450 |
| 7,753,045 | B1 * | 7/2010 | Weese | A47J 37/0786 126/25 B |
| 7,856,924 | B1 * | 12/2010 | Stihi | A47J 37/0731 126/25 AA |
| 8,430,088 | B1 * | 4/2013 | Gallaher | A47J 37/0694 211/144 |
| 8,887,627 | B1 * | 11/2014 | Baik | A47J 37/0704 126/41 B |
| 10,058,212 | B2 | 8/2018 | Barajas et al. | |
| 12,029,349 | B2 * | 7/2024 | Masek | A47J 37/0786 |
| 2003/0066521 | A1 * | 4/2003 | Horvath | A47J 37/0704 126/30 |
| 2004/0031478 | A1 * | 2/2004 | Gifford | A47J 37/0694 126/25 AA |
| 2004/0069299 | A1 * | 4/2004 | Le | F24C 15/168 126/337 R |
| 2004/0112371 | A1 * | 6/2004 | Le | F24C 15/168 126/337 R |
| 2005/0217660 | A1 * | 10/2005 | Wilson | A47J 37/0704 126/25 R |
| 2008/0099009 | A1 * | 5/2008 | Watrous | A47J 37/0786 126/25 R |
| 2009/0020108 | A1 * | 1/2009 | Chiang | A47J 37/0704 126/25 R |
| 2009/0200906 | A1 * | 8/2009 | Dao | F24C 15/16 312/410 |
| 2009/0272278 | A1 | 11/2009 | von Herrmann et al. | |
| 2010/0006083 | A1 | 1/2010 | Educate et al. | |
| 2011/0283989 | A1 * | 11/2011 | Ikeda | A47J 37/0704 126/25 A |
| 2012/0260903 | A1 * | 10/2012 | Buerkle | F23H 17/08 126/25 R |
| 2013/0032130 | A1 * | 2/2013 | Jacques | A47J 33/00 126/30 |
| 2013/0042852 | A1 * | 2/2013 | Cottrell | F23Q 13/04 126/25 B |
| 2014/0224240 | A1 * | 8/2014 | Chung | A47J 37/0704 126/25 R |
| 2014/0261377 | A1 * | 9/2014 | Chung | A47J 45/085 126/25 R |
| 2015/0047625 | A1 | 2/2015 | Weil | |
| 2015/0196163 | A1 * | 7/2015 | Robles | A47J 33/00 126/25 R |
| 2015/0272387 | A1 * | 10/2015 | Stanger | A47J 37/0611 29/401.1 |
| 2015/0351585 | A1 * | 12/2015 | Blackhurst | A47J 37/0694 126/25 R |
| 2017/0238759 | A1 * | 8/2017 | Prior | A47J 37/0704 |
| 2017/0347835 | A1 * | 12/2017 | Stein | A47J 33/00 |
| 2019/0000270 | A1 * | 1/2019 | Eisendrath | A47J 37/0704 |
| 2020/0072474 | A1 * | 3/2020 | Nelson | F24C 15/16 |
| 2021/0059471 | A1 * | 3/2021 | Hundley, Jr. | A47J 37/0704 |
| 2021/0289985 | A1 * | 9/2021 | Wagner | A47J 33/00 |
| 2022/0000311 | A1 * | 1/2022 | Ebersold | A47J 37/0763 |
| 2022/0167791 | A1 * | 6/2022 | Masek | A47J 37/0786 |
| 2022/0248904 | A1 * | 8/2022 | Carballo | A47J 37/0786 |
| 2022/0330750 | A1 * | 10/2022 | Yekutiely | A47J 37/079 |
| 2022/0386812 | A1 * | 12/2022 | Hughes | A47J 37/0786 |
| 2023/0025014 | A1 * | 1/2023 | Perry, II | A47J 37/0704 |
| 2023/0095172 | A1 * | 3/2023 | Cao | A47J 37/0763 126/9 B |
| 2023/0132862 | A1 * | 5/2023 | Spinney | F24B 1/193 126/25 R |
| 2023/0144466 | A1 * | 5/2023 | Xu | A47J 37/0629 99/421 R |
| 2023/0233021 | A1 * | 7/2023 | Adams | A47J 37/0694 99/449 |
| 2024/0172892 | A1 * | 5/2024 | Melkomian | A47J 37/0763 |
| 2024/0251991 | A1 * | 8/2024 | Tian | A47J 37/0745 |
| 2024/0251992 | A1 * | 8/2024 | Brown | A47J 43/18 |
| 2025/0134308 | A1 * | 5/2025 | Liles | A23B 4/0526 |
| 2025/0331681 | A1 * | 10/2025 | Whitten | A47J 37/0786 |
| 2025/0338998 | A1 * | 11/2025 | Goff, IV | A47J 37/0786 |

FOREIGN PATENT DOCUMENTS

| | | |
|---|---|---|
| JP | 3836967 B2 | 10/2006 |
| KR | 10-1036295 | 5/2011 |

OTHER PUBLICATIONS

International Bureau, International Preliminary Report on Patentability and Written Opinion (IPRP) for PCT/US2023/036715, mailed May 22, 2025.

* cited by examiner

113

113

114          114

SWITCHABLE GRILL GRATE ASSEMBLY FOR A COOKING GRILL

CROSS-REFERENCE TO RELATED APPLICATIONS

This application claims the benefit of U.S. Provisional Patent Application No. 63/278,096 filed Nov. 10, 2021, which is incorporated herein by reference.

BACKGROUND

The present invention relates to barbecue grills and accessories, and more particularly to the grill grates of a barbecue grill on which the food being cooked is placed.

Barbecue grills are widely used to cook a wide variety of foods for home consumption. Almost all grills include a grill grate located over a heat source, such as hot briquets or gas burners. In most grills the grill grate is stationary, however, in some the grill grate can be raised or lowered to adjust the height of the grill relative to the heat source.

By design (or sometimes unintentionally) the heat sources used in barbecues are able to supply heat that is unevenly distributed under the grill grate of the barbecue. For example, gas barbecues are normally provided with multiple, separately adjustable burners that allow heat to be increased under one side of the barbecue grill grate relative to the other side of the grate. Similarly, in a barbecue using briquets as a heat source, the burning briquets can be concentrated on one side of the barbecue grill or the other such that most of the heat supplied by the burning briquets is concentrated under a portion of the grill grate. To control cooking speeds and prevent overcooking food items, and to prevent flare-ups caused by grease dripping from meat products, persons charged with barbecuing the food will often need to move the food items on the grill grate between hotter and cooler regions of the grill. Normally, this is done by using a suitable barbecue tool, typically a spatula, fork, or tongs, to pick-up and move or slide food items across the grill grate from a hot side to a cool side of the grill. Similarly, one may want to move or slide a food item staged on a cooler side of the grill over to a hotter side for accelerated cooking or searing.

However, moving or sliding food items across a grill is cumbersome and can be especially difficult when dealing with multiple food items. Also, depending on the size of the food items, maneuvering foods on the grill grate can result in one or more food items falling through the grill grate, which most often means the food items are lost. Still further, during flare-ups, it is often difficult to react quickly enough to prevent the food items from being burnt, particularly if the food items stick to the grill grate.

Some of the above-mentioned difficulties can be addressed in barbecues provided with the capability of raising and lowering the grill grate to vertically reposition the food relative to the barbecue's heat source. However, the mechanisms for raising and lowering grates are relatively slow and don't allow for horizontally repositioning the food items across the grill grate. Vertical repositioning is unlikely to solve the problem of flare-ups and is an inefficient way of moving food items between different heat zones.

The present invention overcomes the present difficulties in moving food items between different heat zones under a barbecue grill grate. The invention provides a quick and easy way to transfer food items on one side of a barbecue to the other without the need for barbecue tools and without the need to lift the food items off of the grill grate or to slide the food items on the grill grate. In the case of flare-ups, food items situated on the grill grate over the flare-up can be quickly moved from one side of the grill to the other away from the flare-up.

The invention provides yet another advantage where smoker boxes filled with wood chips or the like are deployed below the grill grate. Using the switchable grill grate in accordance with the invention, the smoker boxes can be easily accessed and refilled with a simple lifting motion that temporarily repositions portions of the hot grill grate that cover the smoker box.

Other objects and advantages of the invention will be apparent from the description below of the illustrated embodiments of the invention.

SUMMARY OF THE INVENTION

The invention provides for a switchable grill grate assembly for a cooking or barbecue grill. ("Cooking grill" and "barbecue grill" are used interchangeably herein. Neither use is intended to limit the application of the invention to a type of grill, or to grills intended for outdoor or indoor grilling.) The switchable grill grate assembly includes a main frame configured to rest on top of a cooking grill. The main frame provides an open support framework for a horizontal slide track, which extends from one end of the support framework to the other. Separate, suitably equal sized grill grate sections engage with this slide track. A first grill grate section (sometimes referred to herein as the slide grill grate section or simply slide grate) is slidably engaged on a slide track of the support framework so that movement of the first grill grate section is constrained to sliding back and forth on the slide track. A second grill grate section (sometimes referred to herein as the lift grill grate section or simply lift grate) is configured such that it will simply rest on the slide track next to the first grill grate section. The second grill grate section is not constrained to sliding on the slide track and can be lifted upwardly off the slide track. However, the second grill grate section is pivotally connected to the first grill grate section such that, when it is lifted upwardly off of the slide track from a position next to the first grill grate section at one end of the slide track, the following actions take place: i) the first grill grate section slides horizontally on the slide track of the main frame support framework toward the end of the slide track previously occupied by the second grill grate section, and ii) the second grill grate section rotates up and over the first grill grate section as the first grill grate section slides on the slide track underneath the first grill grate section.

In a one aspect of the invention, the main frame of the grill grate assembly includes at least one pivot track that extends upwardly at the backside of the main frame support framework, and the first and second grill grate sections are pivotally connected to this pivot track. When the second grill grate section is lifted up and over the first grill grate section, the pivot track exerts a force on the first grill grate section that causes the first grill grate section to slide under the second grill grate section as the second grill grate sections is lifted and rotated up an over the first grill grate section.

In another aspect of the invention the pivot track is eliminated, and the relative movements of the grill grate sections are controlled by pivot arms and guide rods that tie the two grill grate sections together and to the main frame so that the desire actions of the grill grate sections take place; namely: the slide grill grate section slides horizontally on the slide track of the main frame support framework toward the end of the slide track previously occupied by the second grill grate section, as the lift grate rotates up and over the slide grate.

Other aspects of the invention will be apparent from the following specification and claims.

BRIEF DESCRIPTION OF THE DRAWINGS

FIG. 10A is a top perspective view of a switchable grill grate assembly showing the first and second grill grate sections deployed side-by-side on the main frame in first positions.

FIG. 10B is a top perspective view of a switchable grill grate assembly showing the second grill grate section lifted partway up from the slide rails of the main frame and the first grill grate section slid a distance on the slide rails of the main frame in response to the lifting of the second grill grate section.

FIG. 10C is a top perspective view of a switchable grill grate assembly showing the second grill grate section lifted up to its maximum height above the slide rails of the main frame and the first grill grate section slid to a mid-point on the slide rails of the main frame in response to the further lifting of the second grill grate section.

FIG. 10D is a top perspective view of a switchable grill grate assembly showing the second grill grate section descending toward the slide rails of the main frame as the first grill grate section slides further toward the other side of the main frame previously occupied by the second grill grate section.

FIG. 10E is a top perspective view of a switchable grill grate assembly showing the second grill grate section descended onto the slide rails of the main frame in the position previously occupied by the first grill grate section and showing the first grill grate section slid all way to the other side of the main frame previously occupied by the second grill grate section.

Figure 1:
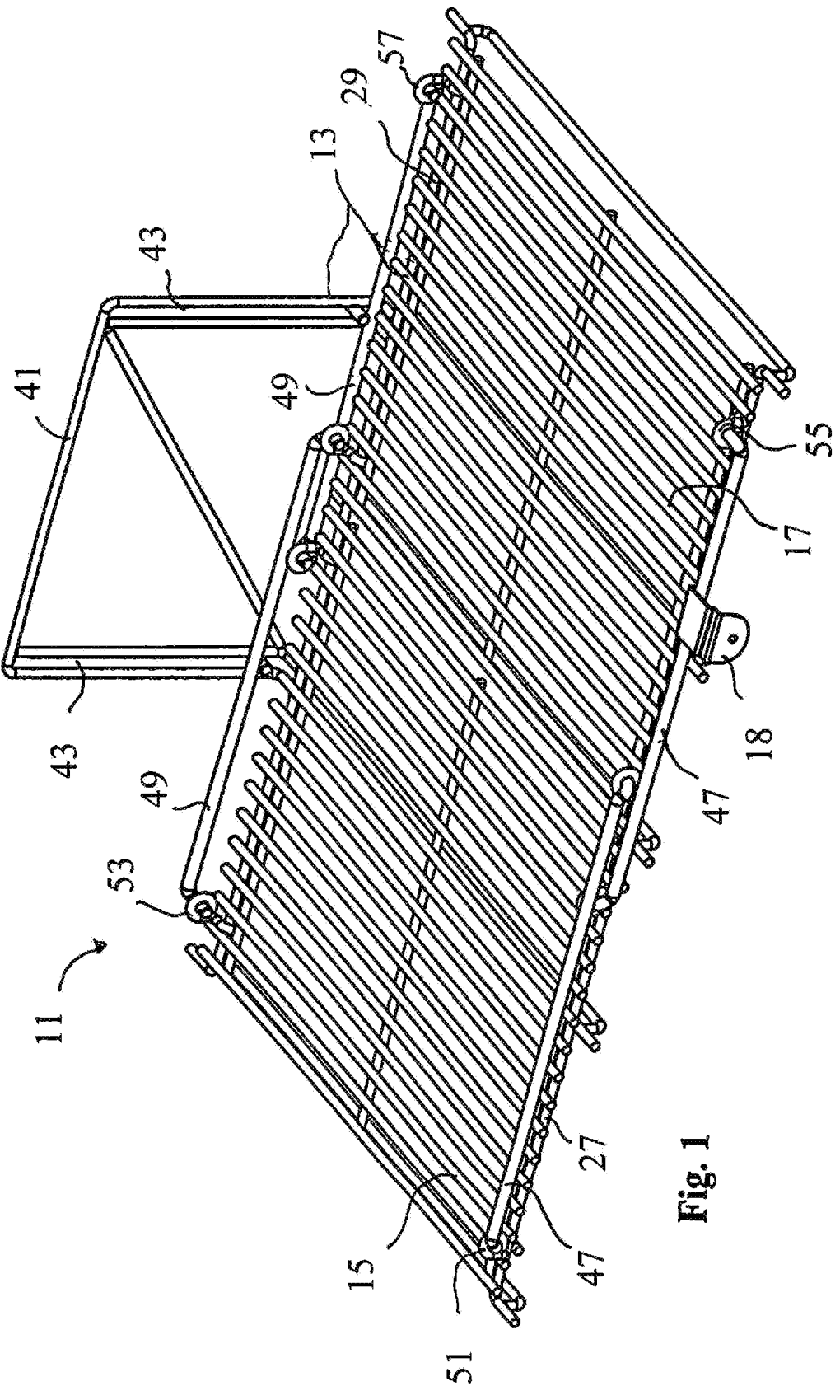
FIG. 1 is a top perspective view of a switchable grill grate assembly for a cooking grill in accordance with the invention.

DESCRIPTION OF ILLUSTRATED
EMBODIMENT

A switchable grill grate assembly in accordance with the invention can be used on an existing barbecue grill. The assembly has a footprint defined by its shape and dimensions in plan view, and this footprint can be made to match the footprint of grill grates of different commercially available barbecues. This will allow the assembly to replace the grill grate of the barbecue. However, it is contemplated that the assembly could be made in sizes and shapes that do not conform to footprint of a commercially available barbecue grill grates. In this case, the assembly would instead sit on top of the existing grill grate of the barbecue. The parts of the assembly hereinafter described would be fabricated of steel or other heat resistant material, and indeed can be fabricated almost entirely from welded together steel rods, suitably, for example, 6 mm steel rods.

Referring now to the drawings, the grill grate assembly, denoted by the numeral 11, includes a main frame 13 and first and second grill grate sections 15, 17 supported on the main frame as hereinafter described. Preferably, the two grill grate sections have the same overall dimensions or footprint. When resting side-by-side, the combined footprint of the grill grate sections will preferably cover a substantial portion if not the entirety of the bowl of the barbecue that holds the barbecue's heat source or sources.

Figure 2:
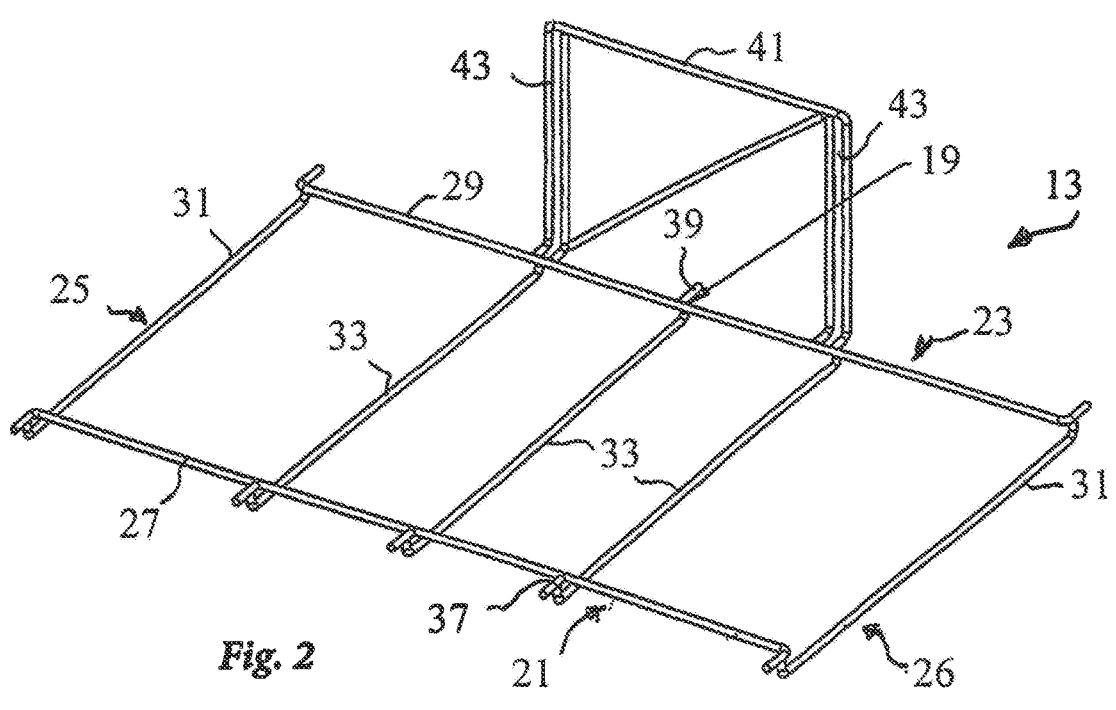
FIG. 2 is a top perspective view of the main frame for the switchable grill grate assembly shown in FIG. 1.
Figure 3:
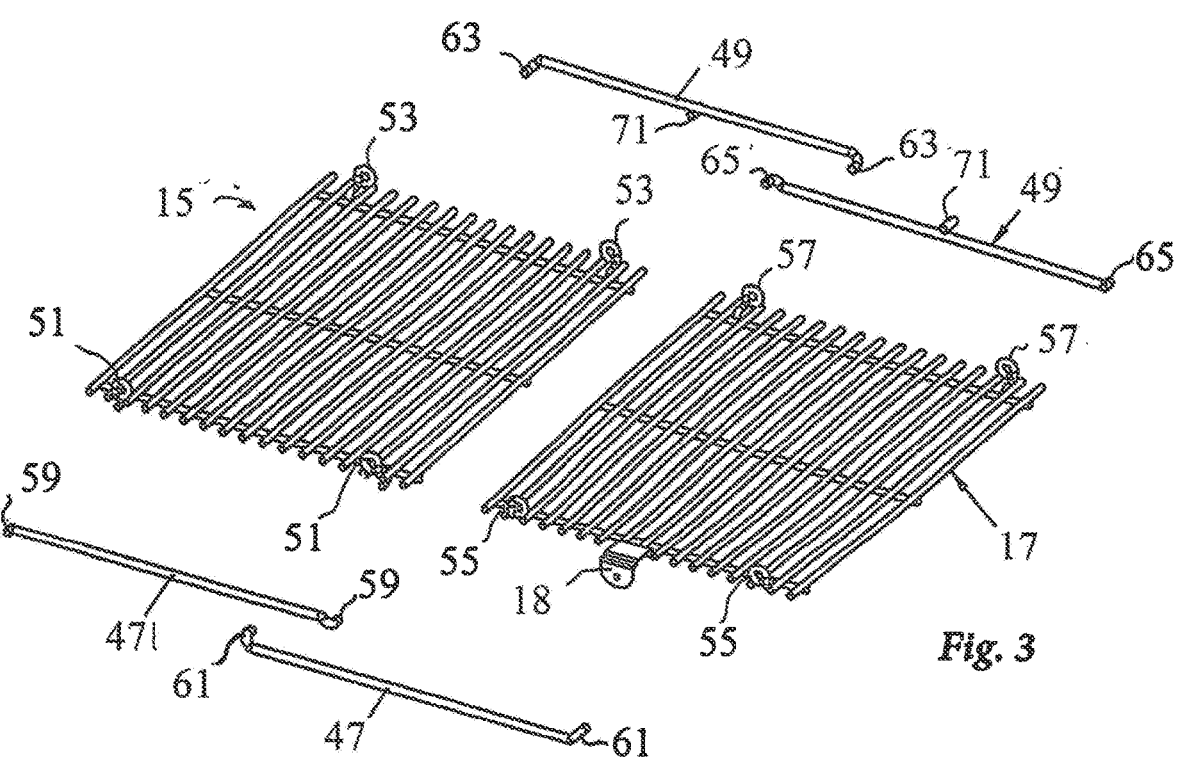
FIG. 3 is an exploded top perspective view of the movable grill grate sections and pivot rods of the switchable grill grate assembly shown in FIG. 1.
Figure 4:
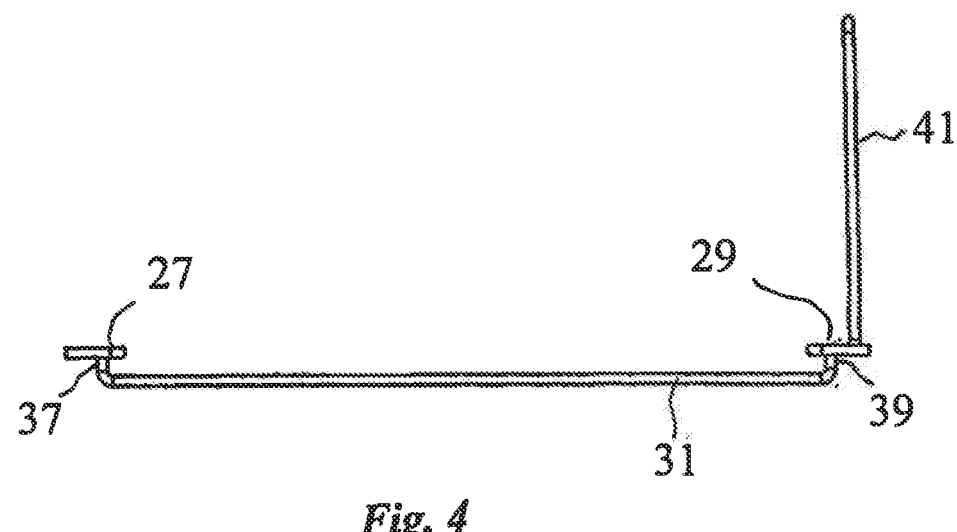
FIG. 4 is an end elevational view of the main frame of the assembly.
Figure 5:
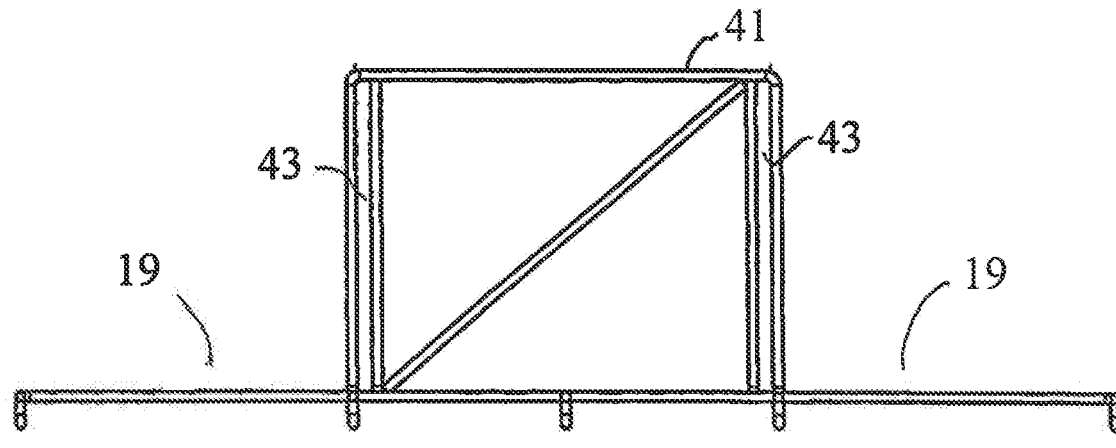
FIG. 5 is a front elevational view of the main frame of the assembly.

The main frame 13, which is separately illustrated in FIG. 2, has a structurally open support framework 19 with definable sides and ends, namely, a front side 21, a back side 23, a first end 25, and a second end 26. (By "structurally open," it is meant that the structural elements of the main frame must not appreciably impede heat flow to the grill grate sections of the assembly.) The front and back of the frame's support framework are formed and defined by longitudinally extending slide bars 27, 29, which form a slide track, denoted by the numeral 30, that extends between the first and second ends of the main frame. As best seen in FIG. 2, a series of crossbars extend between slide bars 27, 29. These include outer crossbars 31 at the ends of the slide bars and intermediate crossbars 33. The crossbars are attached to the slide bars so as not to obstruct the top of the slide bars. Suitably, crossbars 31, 33 have upturned ends 37, 39, which are used to attach the ends of the crossbars to the underside of the slide bars. Thus, the crossbars will be in a plane beneath the plane of the slide bars. It is contemplated that the ends 37, 39 of the cross bars 37, 39 will be attached to the underside of the slide bars by welding them together, however, other means of attachment could be used.

The main frame additionally includes a pivot guide framework 41 extending up from the back side 23 of support framework 19. This framework, which includes two spatially separated vertical pivot tracks 43 is, as later described, used to control the travel of the grill grate sections 15, 17 as they are repositioned on the support framework of the main frame.

Grill grate sections 15, 17 differ in that grill grate section 15 (the first grill grate section) is slidably fixed to the support framework of the main frame whereas grill grate section 17 (the second grill grate section) is not. More specifically, in the illustrated embodiment, grill grate section 15 slidably engages with slide track of the main frame support framework so that it will not lift off the slide track. Rather its travel is limited to sliding back and forth between the first end 25 and second end 26 of the main frame support framework. Grill grate section 17 on the other hand simply rests on the slide track with no fixed engagement that would prevent it from being lifted off of the slide track. A handle, such as handle 18 shown in the drawings, can be attached to the front edge grill grate section 17 to facilitate lifting of this section off of the main frame support framework during cooking. The handle would preferably be of a thermally insulating material or designed with a thermal barrier so that the handle itself does not become hot.

The sliding engagement of the first grill grate section 15 on the slide track is achieved by the provision of open slide hooks 45 that extend underneath the grill grate section so as to loop over the main frame support framework slide bars 27, 29. (These slide hooks can be an extension of eyelet anchors for the assembly's rocker arms described below.)

The first and second grill grate sections are tied together by two sets of rocker arms, namely, front rocker arms 47 and back rocker arms 49, the latter of which are also referred to herein as pivot rocker arms. The ends of these sets of rocker arms pivotally connect to pivot anchors on the front and back sides of the grill grate sections. In the illustrated embodiment, the pivot anchors are provided in the form of front and back eyelet anchors 51, 53 in the case of the first grill grate section and front and back eyelet anchors 55, 57 in the case of the second grill grate section. The front eyelet anchors 51, 53 receive inwardly bent ends 59 and 61 of the two front rocker arms 47 and the back eyelet anchors receive inwardly bent ends 63 and 65 of the two back pivot rocker arms 49. Suitable retention means such as cotter pins (not shown) can be provided on the ends of the rocker arms, the portion that projects through the eyelet anchors, for pivotally holding the ends of the rocker arms in the eyelets.

Figures 6, 7:
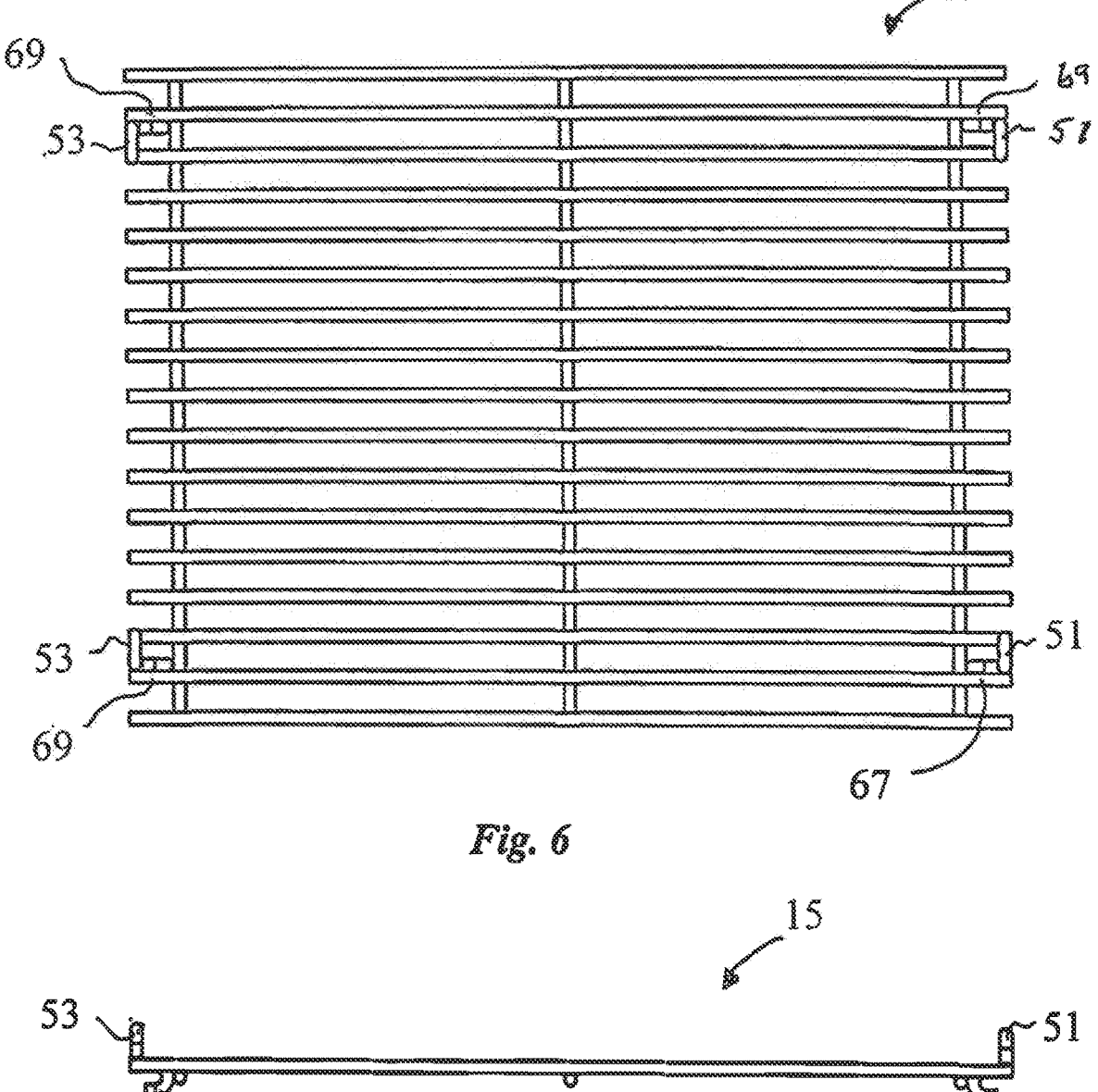
FIG. 6 is a top plan view of the first grill grate section, which is slidably engaged on the assembly's main frame.
FIG. 7 is a side elevational view thereof.
Figure 8:
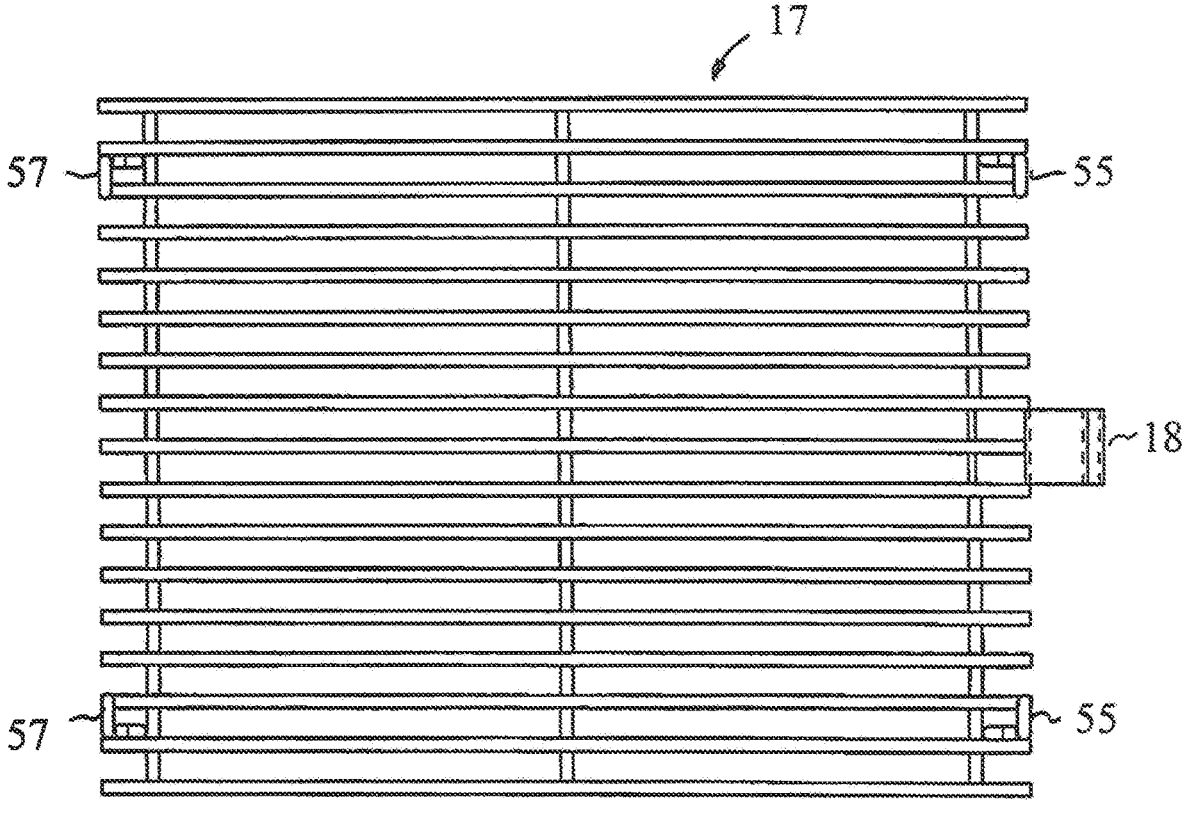
FIG. 8 is a top plan view of the second grill grate section, which rests on and can be lifted up from the assembly's main frame.
Figure 9:
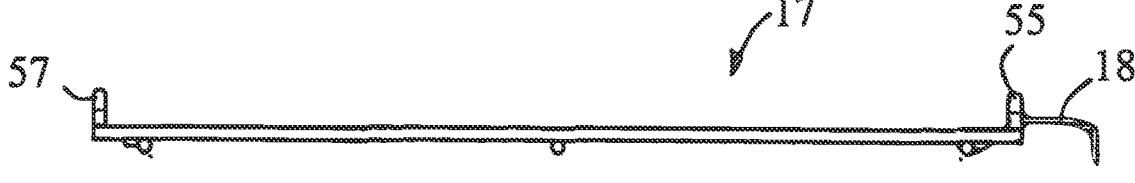
FIG. 9 is a side elevational view thereof.

As seen in the illustrated embodiment, the rocker arm eyelet anchors 51, 53 and 55, 57 are optimally positioned at or near the corners of the grill grate sections and preferably project upwardly from the plane of the two grill grate sections so as to engage the ends of the rocker arms above this plane of the grill grate sections. The eyelet anchors can suitably be secured to the front and back sides of the grill grate sections by welding the eyelets to the inside of selected cross bars of the grill grate, and most suitably to one of the outermost cross bars at opposite ends of the grill grate sections. For example, as best seen in FIG. 6, which shows the first grill grate section 15, eyelet anchors 51, 53 are shown secured to the inside edge of the grate's crossbars 67, 69 at the ends of the crossbars. As best seen in FIG. 7, the above described open slide hooks 45 that extend underneath the grill grate section and hold the first grill grate section in sliding engagement on the slide track of the main frame support framework can be provided as an extension of eyelet anchors 51, 53. The eyelet anchors 55, 57 on the second grill grate section would omit these slide hooks as the grill grate section is intended to be lifted off of the slide track of the main frame support framework as above described.

In addition to helping to tie the two grill grate sections together, the two back pivot rocker arms 49 tie the grill grate sections to the upright pivot guide framework 41 that extends up from the back side 23 of the main frame's support framework 19. More specifically, in the illustrated embodiment, each of the pivot rocker arms has an outwardly projecting guide pin 71 that slidably engages in the pivot tracks 43 of this upright framework. The vertical guide tracks force the grill grate sections to move in tandem, with one being forced to slide to the other end of the slide track of the main frame's support framework while the other is being lifted off of the slide track and rotated across the sliding grill grate section.

It will be understood that other structures could be devised that tie the first and second grill grate sections together and that force them to move in tandem as above described, that is having one grill grate section sliding across the slide track of the support framework of the main frame as the other lifts and rotates over the sliding section. The invention is intended to encompass any structures that allow the positions on the main frame to be switched by manipulating only one of the grill grate sections.

FIGS. 10A-10E illustrate the relative movements of the two grill grate sections 15, 17 of the assembly 11 as the two grill grate sections switch places on the barbecue grill. The movements are driven by the second grill grate section 17, which can be referred to as the lift section. For purposes of the description below, the grill grate section that is slidably engaged on the slide track of the main frame support framework can be referred to as the slide section.

Figure 10A:
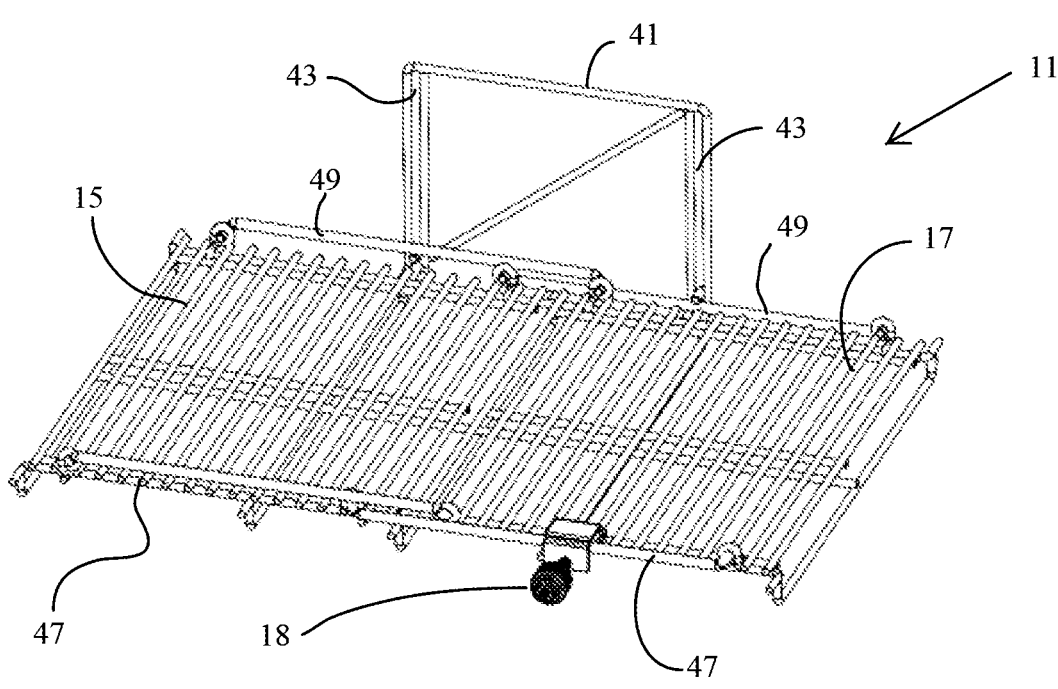
FIGS. 10A-10E illustrate the range of motion of the first and second grill grate sections as the second grill grate section (in the rightmost starting position on the main frame) is lifted up and over the first grill grate section until the two grill grate sections change place on the main frame.
Figure 10B:
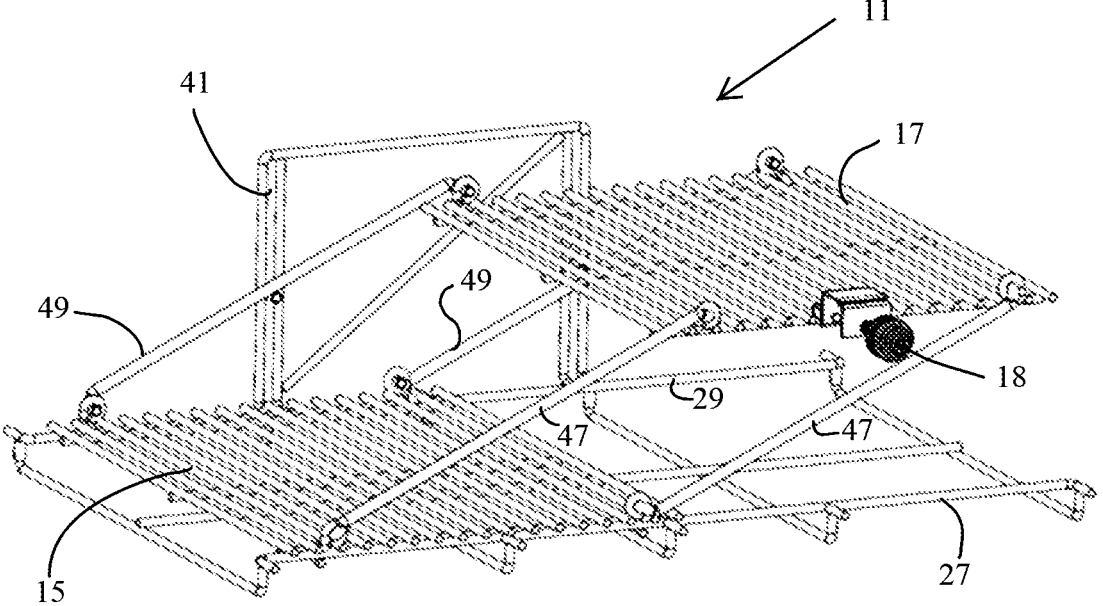
Figure 10C:
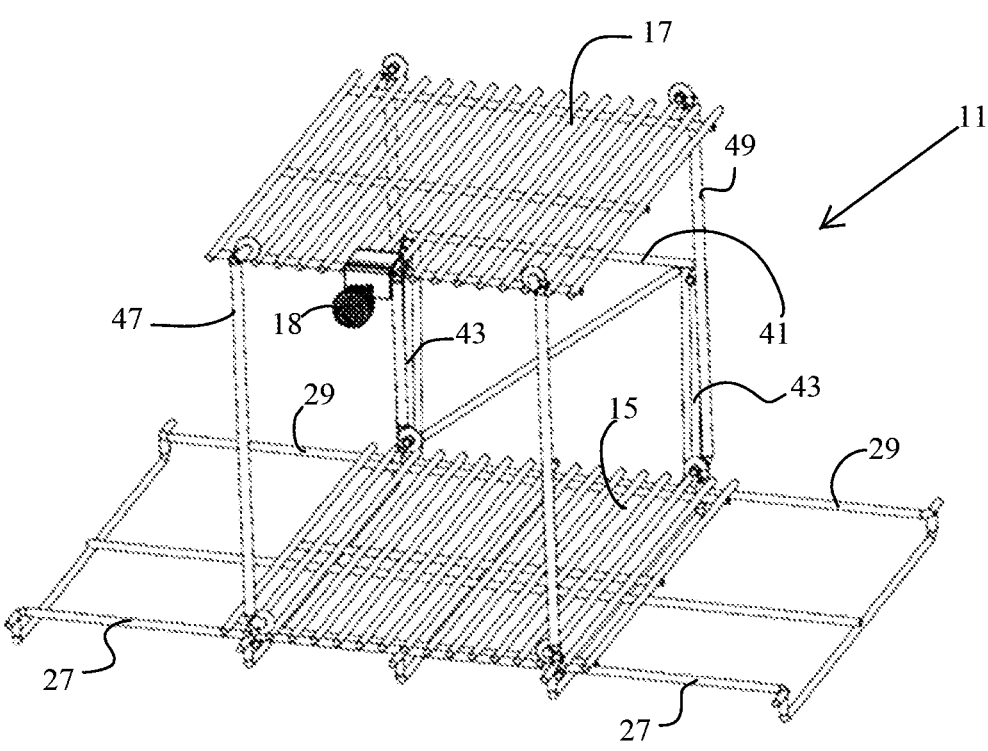

In FIG. 10A, both grill grate sections are shown side-by-side on the slide track of the main frame support framework. In this side-by-side position, food can be placed on either or both sections for cooking or for staging. If and when it is desired to switch food placed on one side of the grill to the other side of the grill, the user simply needs to grip the handle 18 on the lift section and lift this section upwardly. FIG. 10B shows the position of the second grill grate section when lifted part of the way off of the main frame support framework. Due to retention by the pivot tracks as above described, this lifting will cause the slide section to move part of the way toward the position on the slide track previously occupied by the lift section. FIG. 10C shows the maximum height attained by the lift section as the lift section is rotated up and over the slide section. In this position, the lift section is seen to be directly over the slide section.

Figure 10D:
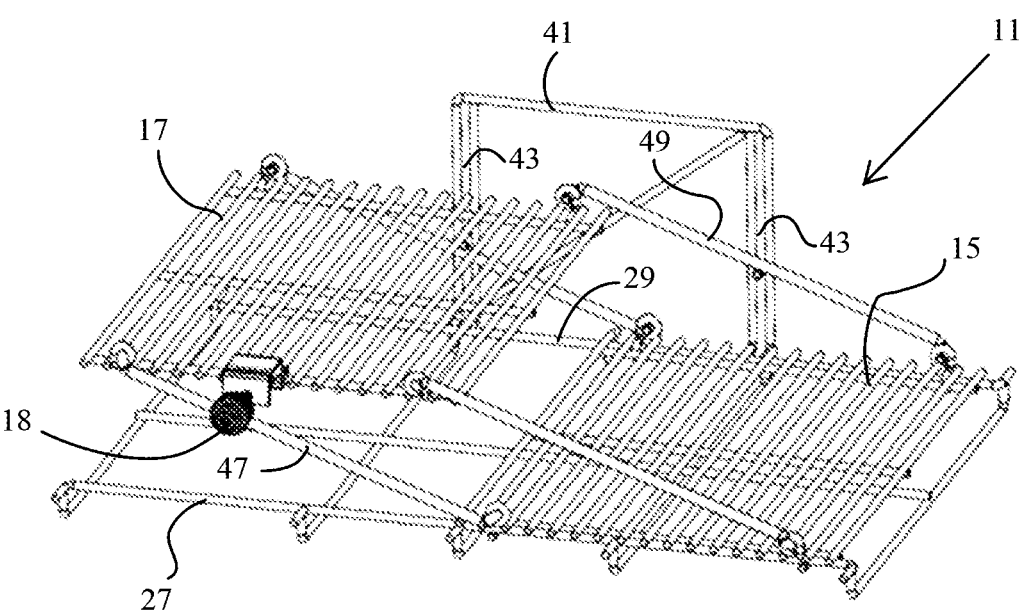
Figure 10E:
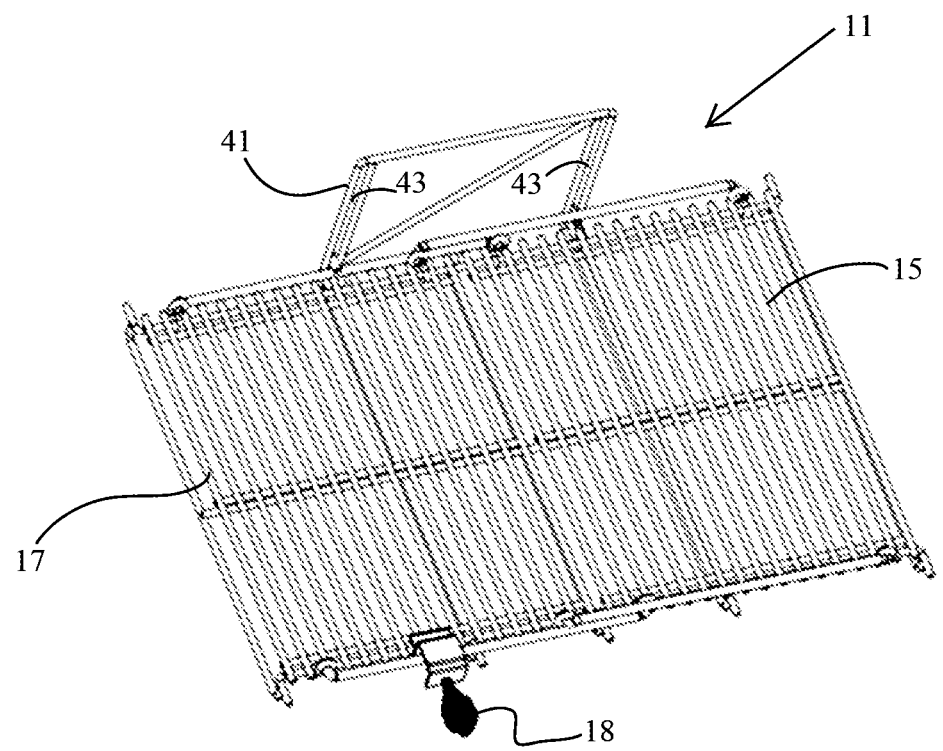
Figure 11:
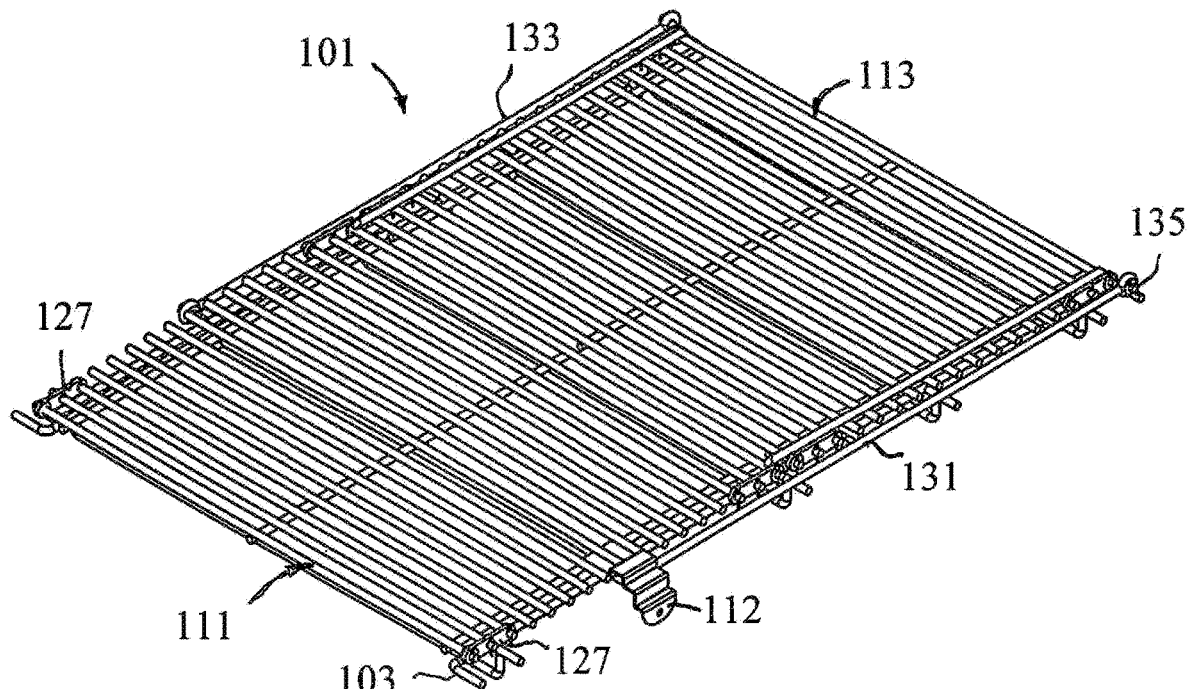
FIG. 11 is a top perspective view of an alternative embodiment of a switchable grill grate assembly in accordance with the invention.
Figure 12:
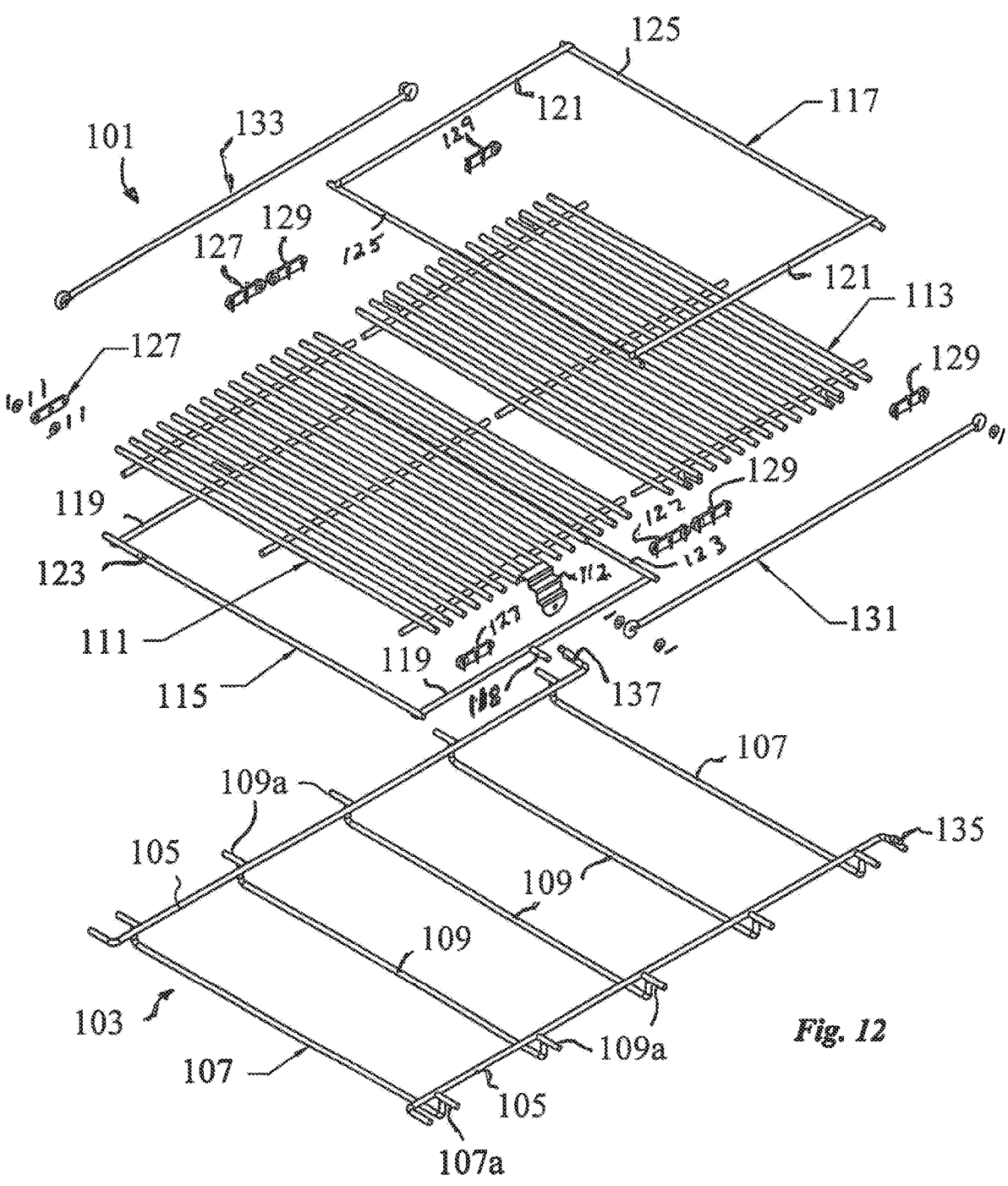
FIG. 12 is an exploded top perspective view of the switchable grill grate assembly shown in FIG. 11.
Figure 13:
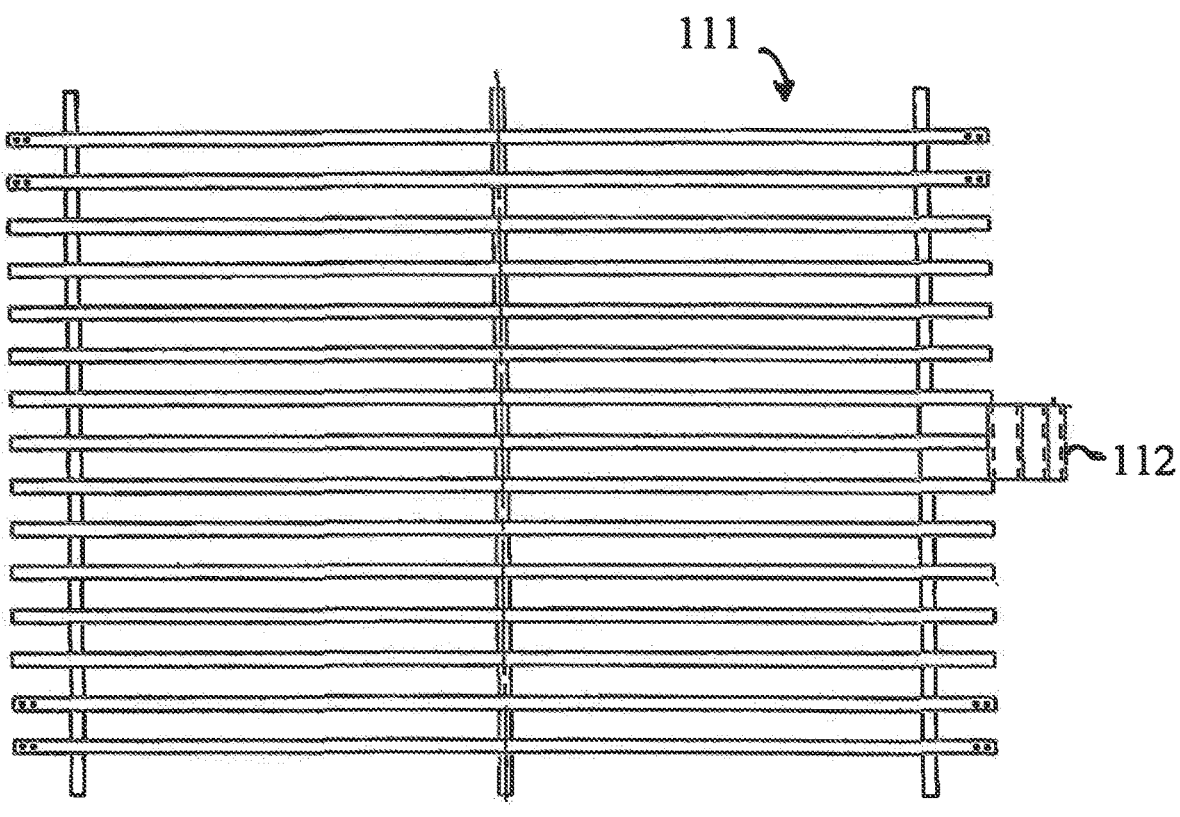
FIG. 13 is a top plan view of the lift grill grate section of the switchable grill grate assembly shown in FIGS. 11 and 12.
Figure 14:
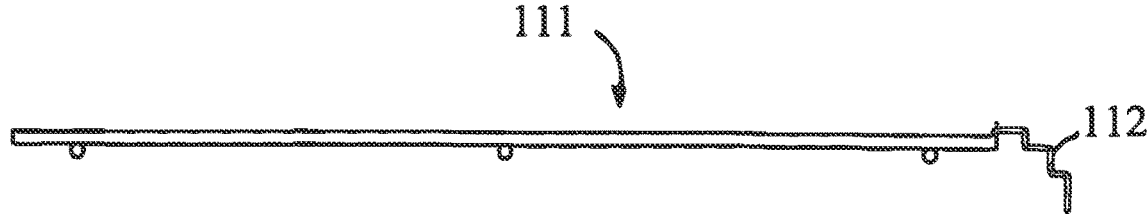
FIG. 14 is a side elevational view thereof.
Figure 15:
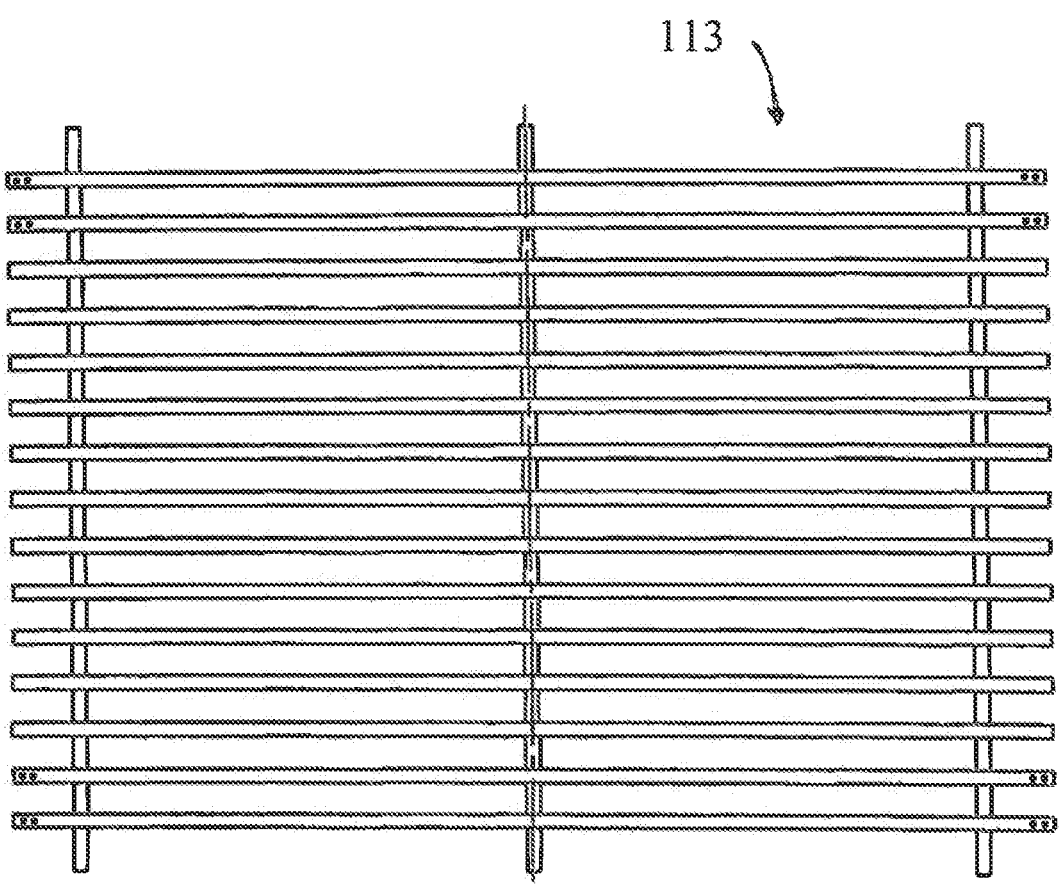
FIG. 15 is a top plan view of the slide grill grate section of the switchable grill grate assembly shown in FIGS. 11 and 12.
Figure 16:
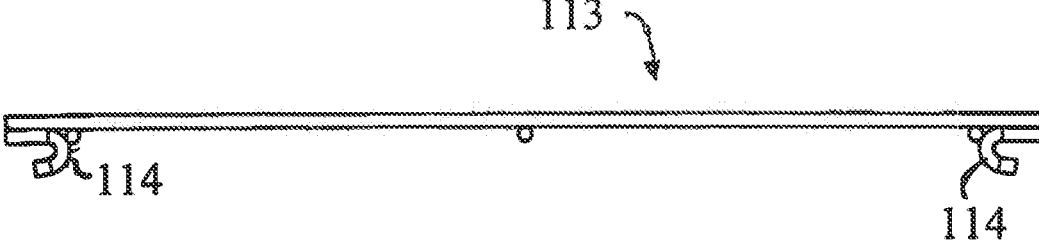
FIG. 16 is a side elevational view thereof.
Figure 17:
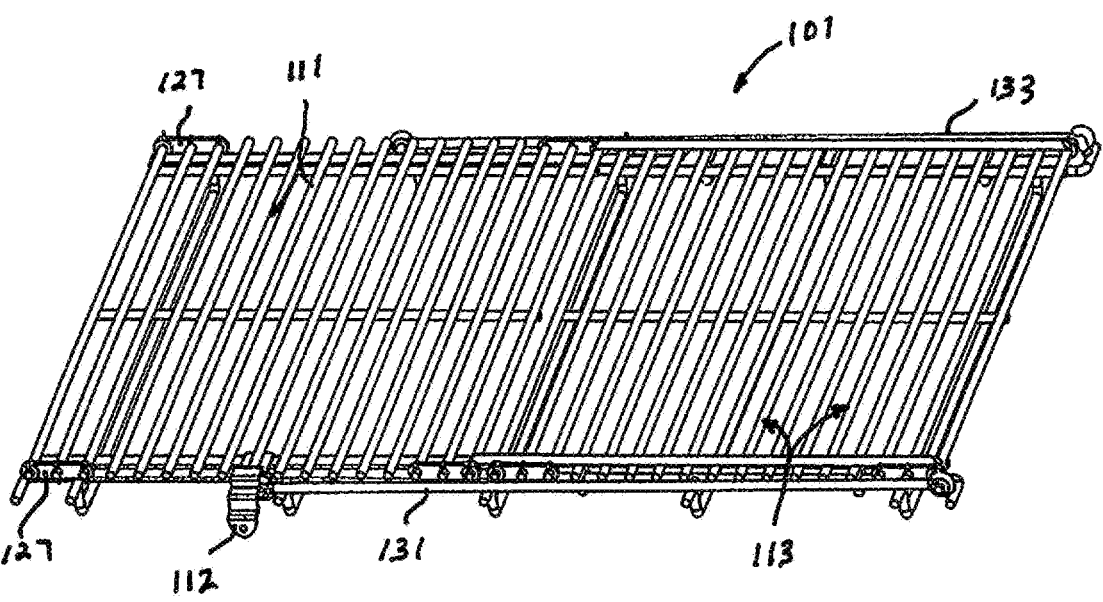
FIG. 17 is a top front perspective view of an implementation of the embodiment of the invention show in FIGS. 11-16.
Figure 18:
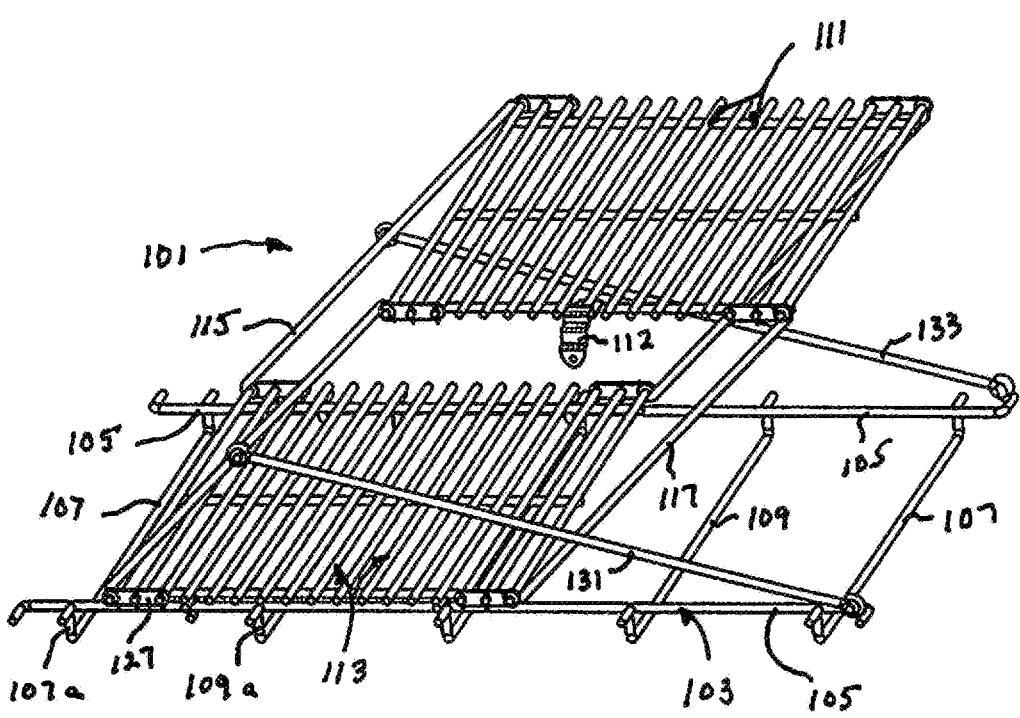
FIG. 18 is another top front perspective view thereof showing the lift grate lifted up and over the slide grate and the corresponding movement of the slide grate on the assembly's slide track.
Figure 19:
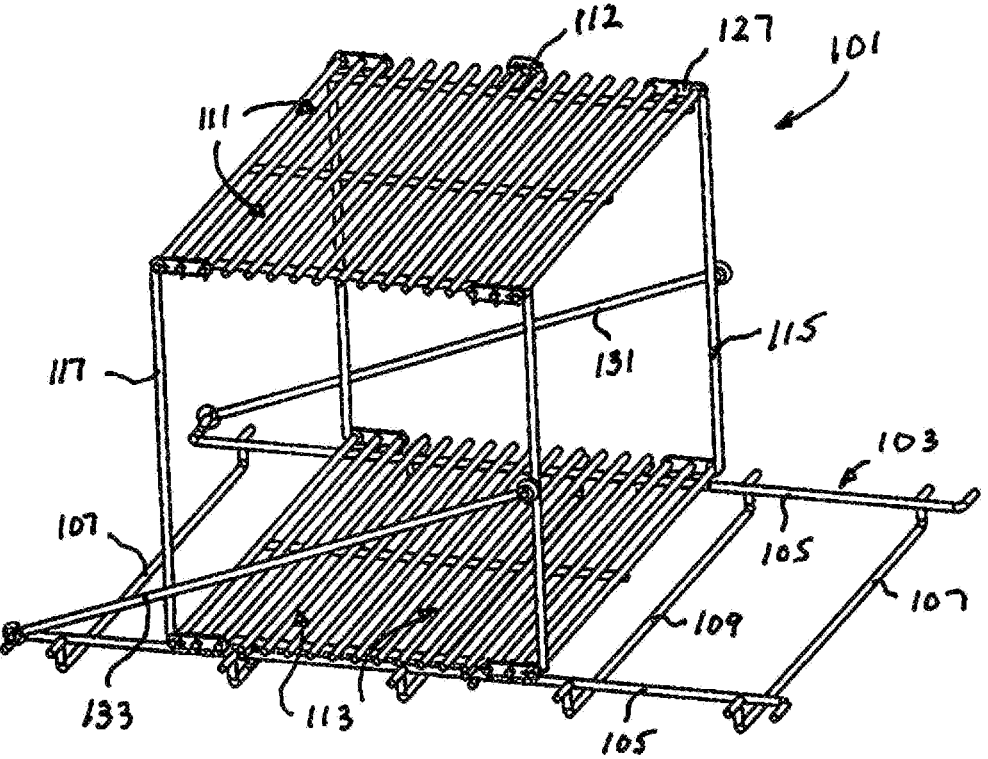
FIG. 19 is top rear perspective view thereof showing the lift grate lifted up directly over the slide grate wherein the slide grate is positioned on the assembly's slide track directly under the lift grate.

FIGS. 10D and 10E show the further changes of position of the lift and slide sections as the user continues to rotate the lift section over the slide section. All the while during these position changes the slide section remains in sliding engagement on the main frame support framework. FIG. 10E shows the complete reversal of the positions of the lift and slide sections of the assembly as the lift section is dropped into place on the slide track of the main frame support framework. With this reversal, food items previously on one end of the grill will have been switched to the other end of the grill without having to pick up or slide the food on the grill. This can be done quickly in response to changing conditions in the heat source or in the particular cooking requirements for the food items.

In the embodiment of the invention illustrated in FIGS. 11-19, the pivot guide framework 41 shown in the preceding figures and that extends up from the back of the main frame's support framework 19 is eliminated. In this embodiment, the assembly 101 includes a main frame 103 the entirety of which serves as the support framework for the grill grate sections. The main frame includes longitudinally extending slide bars 105, which, as in the previously described embodiment, form a slide track that extends between the ends of the main frame. Crossbars extend between slide bars to form a rigid framework. These include outer crossbars 107 at the ends of the slide bars and intermediate crossbars 109. As in the previous embodiment, the crossbars are attached to the slide bars so as not to obstruct the top of the slide bars, and suitably have upturned ends 107a, 109a, which are used to attach, such as by welding, the ends of the crossbars to the undersides (bottom or sides) of the slide bars.

In this embodiment the rocker arms that pivotally tie the lift grate 111 and slide grate 113 together are provided by rectangular hoops 115, 117, suitably fabricated of bar stock, and most suitably of metal bars. The front and back bars 119, 121 of the hoops serve as grill grate rocker arms, while the side bars 123, 125 provide an axis about which the rocker arms can pivot. The side bars 123, 125 are held between adjacent bars of the grill grate sections by means of front and back sets of pivot plates 127, 129 that clamp onto adjacent bars of the grill grate and capture the hoop side bars so that they can rotate within the pivot plates. It is seen that the front and back bars 119 of the hoop 115 which serve as rocker arms for the lift grate 111 have outwardly projecting posts 127 centered midway between the ends of the bars. These posts provide pivot connection points for pivot guide rods 131, 133, that are additionally provided tying lift grate to the main frame. The guide rods will force the slide grate to slide under the lift grate as the lift track is lifted.

In particular, it is seen that the slide grate in the embodiment shown in FIGS. 11-19 has a construction similar to the construction of the slide grate shown in FIGS. 1-10. Open slide hooks 114 on the underside of the slide grate hold the slide grate in sliding engagement on the slide track of the main frame as it is forced to move. One end of the pivot guide rods 131, 133 pivotally attach to posts 118 on the rocker arms 119 while the opposite end is attached to the two pivot posts 135, 137 on the corners of the main frame opposite the rocker arms 119. The ends of the guide rods can be held to their respective pivot posts by any suitable retaining means such as cotter pins.

While the present invention has been described and illustrated in considerable detail in the foregoing specification and in the accompanying drawings, it is not intended that the invention be limited to such detail except as may by necessitated by the following claims.

We claim:

1. A switchable grill grate assembly for a cooking grill, comprising:
    a main frame configured to rest on top of a cooking grill, the main frame providing a support framework having a front side, a back side, a first end, and a second end, the support framework having a horizontal slide track extending between the first end and second end of the support framework,
    a first grill grate section slidably engaged on the slide track of the main frame support framework so that the first grill grate section can slide back and forth between the first end and second end of the main frame, and
    a second grill grate section adapted to rest on the slide track of the main frame next to the first grill grate section and further adapted to be lifted upwardly off of the slide track of the main frame support framework,
    the second grill grate section being connected to the first grill grate section such that, when the second grill grate section is lifted upwardly off of the slide track of the main frame support framework and over the first grill grate section from one of the first or second ends of the main frame support framework toward the other of the first or second ends of the main frame support framework, the first grill grate section slides on the slide track of the main frame support framework under the second grill grate section toward the opposite first or second end of the main frame support framework previously occupied by the second grill grate section.

2. The switchable grill grate assembly of claim 1 wherein each of the grill grate sections have substantially the same footprint.

3. The switchable grill grate assembly of claim 1 wherein the main frame includes at least one pivot tract extending upwardly from the back side of the horizontal slide track of the main frame support framework, the first and second grill grate sections being pivotally connected to the pivot track such that rotation of the second grill grate section up and over the first grill grate section forces the first grill grate section to slide under the second grill grate section toward the position on the slide track of the main frame support framework previously occupied by the second grill grate section.

4. The switchable grill grate assembly of claim 3 comprising two spatially separated pivot tracks extending upwardly from the back side of the horizontal slide track of the main frame support framework, the first and second grill grate sections being pivotally connected to both the spatially separated pivot tracks such that rotation of the second grill grate section up and over the first grill grate section forces the first grill grate section to slide under the second grill grate section toward the position on the slide track of the main frame support framework previously occupied by the second grill grate section.

5. The switchable grill grate assembly of claim 4 further comprising front and back rocker arms pivotally connecting the front and back sides of the first and second grill grate sections and wherein the back rocker arms are additionally pivotally connected to the spatially separated pivot tracks extending upwardly from the back side of the horizontal slide track of the main frame support framework.

6. The switchable grill grate assembly of claim 1 further comprising front and back front and back rocker arms pivotally connecting the front and back sides of the first and second grill grate sections.

7. The switchable grill grate assembly of claim 1 further comprising a hand grip extending from the second grill grate section, the hand grip extending from the front side of the support framework of the main frame such that it can be gripped for rotating the second grill grate section up and over the first grill grate section.

8. A switchable grill grate assembly for a cooking grill, comprising:
    a support framework configured to rest on top of a cooking grill, the support framework having a first end and a second end, and each end of the support framework having defined corners, the support framework further having a horizontal slide track extending between the first end and second end of the support framework,
    a first grill grate section slidably engaged on the slide track of the support framework so that the first grill grate section can slide back and forth between the first end and second end of the support framework, and a second grill grate section adapted to rest on the slide track of the support framework next to the first grill grate section and further adapted to be lifted upwardly off of the slide track of the support framework, two sets of rocker arms pivotably connecting the first grill grate section to the second grill grate section, the rocker arms maintaining a distance between the first and second grill grate sections, guide rods pivotally connecting one set of rocker arms to the corners of the support framework opposite the set of rockers arm to which the guide rods are connected, wherein, when the second grill grate section is lifted upwardly off of the slide track of the support framework from a position next to the first grill grate section at one end of the support framework, the following actions take place:

a) the first grill grate section slides horizontally on the slide track of the support framework toward the end of the slide track previously occupied by the second grill grate section, and b) the second grill grate section rotates up and over the first grill grate section toward the end of the slide track previously occupied by the first grill grate section.

* * * * *